United States Patent [19]
Nishikawa

[11] 4,439,783
[45] Mar. 27, 1984

[54] IMAGE SYNTHESIZING APPARATUS

[75] Inventor: Takuji Nishikawa, Ibaraki, Japan

[73] Assignee: Matsushita Electric Industrial Co., Ltd., Osaka, Japan

[21] Appl. No.: 323,979

[22] Filed: Nov. 23, 1981

[30] Foreign Application Priority Data

Dec. 3, 1980 [JP] Japan .................................. 55-171217

[51] Int. Cl.³ ...................... H04N 9/535; H04N 5/22
[52] U.S. Cl. ...................................... 358/22; 358/183
[58] Field of Search ............... 358/22, 21 R, 183, 182, 358/168, 27

[56] References Cited
U.S. PATENT DOCUMENTS
4,266,242  5/1981  McCoy .................................. 358/22

FOREIGN PATENT DOCUMENTS
55-46671  1/1980  Japan .................................. 358/22

Primary Examiner—Tommy P. Chin
Attorney, Agent, or Firm—Stevens, Davis, Miller & Mosher

[57] ABSTRACT

An image synthesizing apparatus is disclosed which can be used for extracting a portion of one image signal and inserting a portion of another image signal into the extracted part. An extraction signal is obtained by following the brightness level of the latter image signal and the level of the extraction signal is varied by a variable amplitude control signal which varies in response to a variation of the scan domain on the screen surface of a camera which generates the former image signal. As a result, when the scan domain on the screen surface of the camera is varied, a proper image synthesis can always be obtained.

2 Claims, 9 Drawing Figures

IMAGE SYNTHESIZING APPARATUS

BACKGROUND OF THE INVENTION

This invention relates to an image synthesizing apparatus in which two image signals are synthesized by extracting necessary parts from an image signal with use of a brightness level difference. In a television camera which generates image signal outputs for extraction, if it includes a system of varying the scan domain on the screen surface in order to change the size and shape of a projected image on the screen, the output image of an object, though it has a uniform brightness, exhibits a brightness variation depending on the image size and shape. Therefore, in such an apparatus in which extraction is performed by utilizing a brightness difference, the extraction quantity of the parts of an object having the same brightness does not become constant. This makes it difficult to extract desired parts from a synthesized image. Thus, it may happen that unnecessary parts are projected while necessary parts are not.

BRIEF DESCRIPTION OF THE DRAWINGS

The present invention will be apparent from the following detailed description taken in conjunction with the accompanying drawings, in which.

DESCRIPTION OF THE PREFERRED EMBODIMENT

Figure 1:
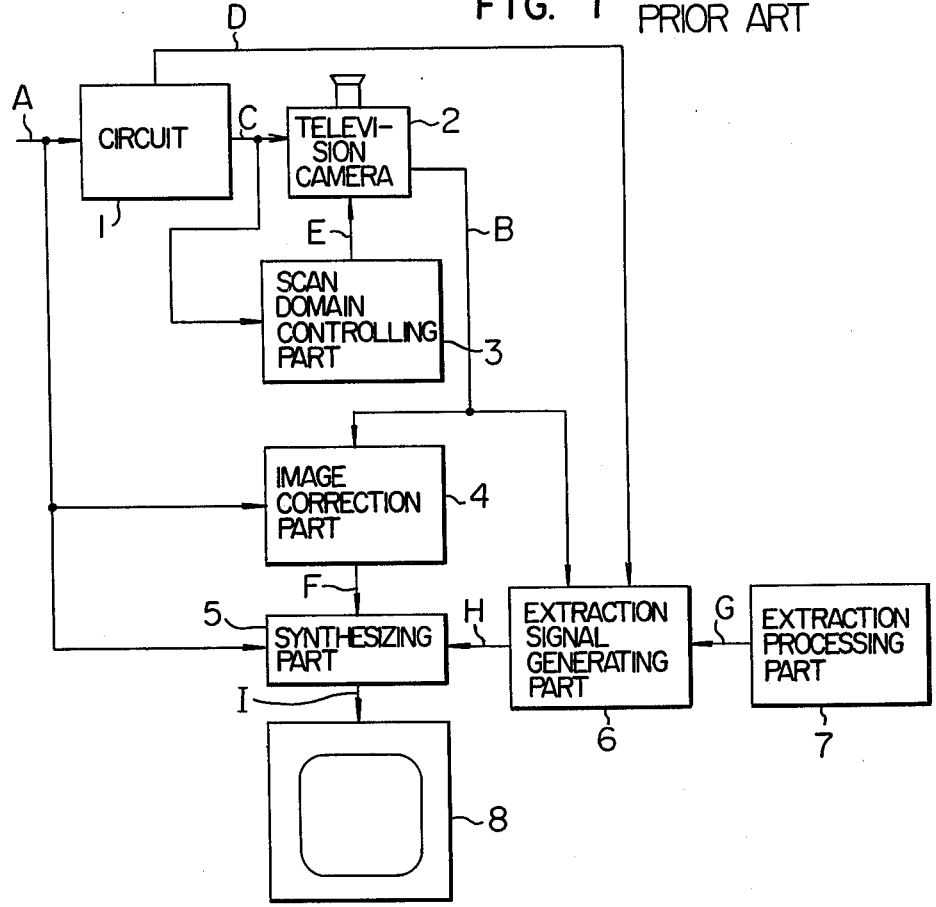
FIG. 1 is a block diagram of an image synthesizing apparatus of a prior art.

In FIG. 1 showing a block diagram of a prior art image synthesizing apparatus, A denotes an image signal. A reference numeral 1 denotes a circuit which performs synchronization-separation of the image signal A to form an external synchronization signal C for a television camera 2 and also to form a blanking signal D for the synthesizing period. 3 is a scan domain controlling part which forms a control signal E for the scan domain on the screen of the television camera 2 from the external synchronization signal C. The output image signal (hereinafter referred to as an image signal B) from the television camera 2 enters a synthesizing part 5 after its color and brightness are controlled by an image correction part 4. 6 is an extraction signal generating part which combines the image signal B and the blanking signal D supplied from the circuit 1, generates an extraction signal H by an extraction-quantity controlling signal G from an extraction processing part 7 and sends it to the synthesizing part 5. Here, the image signal supplied from the image correction part and the image signal A are synthesized by controlling the synthesizing ratio. The synthesized image signal output enters a television monitor 8 where the synthesized image is projected.

Figure 2:
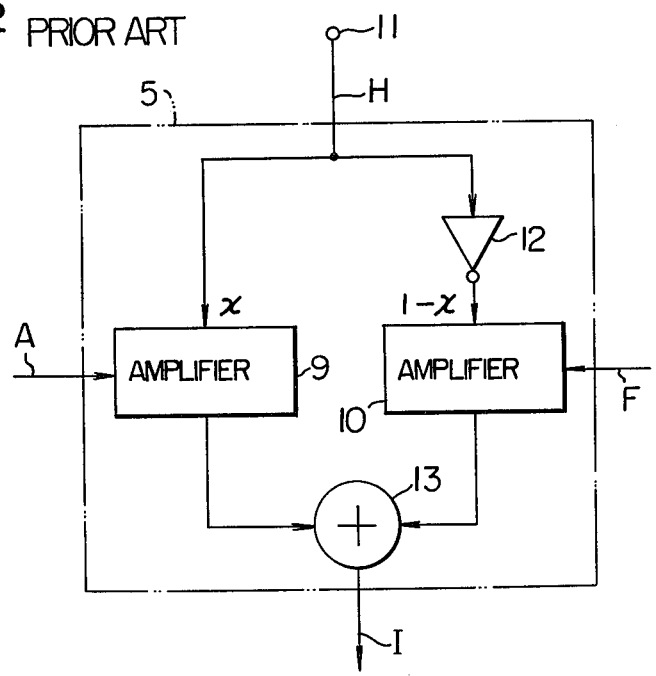
FIG. 2 is a block diagram of a part of the above apparatus.

FIG. 2 is a block diagram of the synthesizing part 5. 9 and 10 denote amplifiers for the image signals. The amplification factors of the amplifiers 9 and 10 are varied by the level of the output signal H of the extraction signal generating part 6 that is given to a terminal 11. 12 is an inverter which inverts the level of the above extraction output signal H. The inverter has a function of setting the amplification factor of the amplifier 10 at $(1-X)$, when the amplification factor of the amplifier 9 is given by X. Signals amplified by the amplifiers 9 and 10 are added by an adder 13 and sent out as an image signal.

Figure 3:
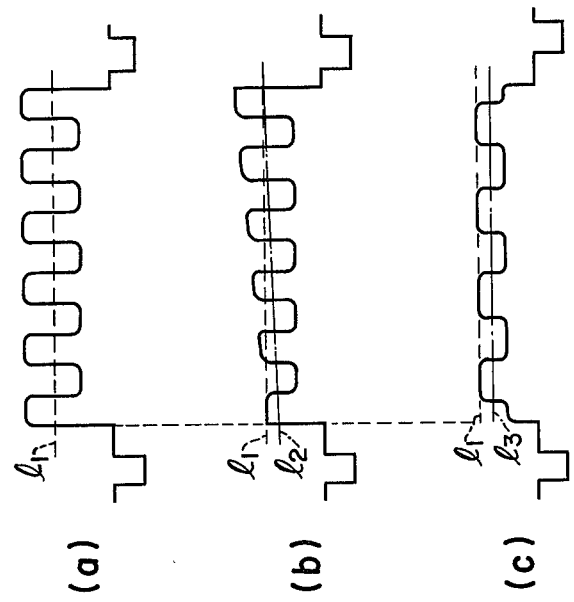
FIG. 3 shows wave forms for the explanation of the above apparatus.
Figure 4:
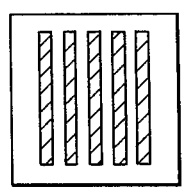
FIG. 4 shows a figure for the explanation of the above apparatus.

Next, explanation will be made of the extraction signal by referring to FIG. 3. (a) of FIG. 3 shows a wave form of the image signal B in one horizontal section. As an object, a figure with black stripes on a field of white as shown in FIG. 4 was chosen and imaged by the television camera 2. In (a) of FIG. 3, dotted lines $L_1$, $L_2$ and $L_3$ represent the levels of an extraction-quantity controlling signal G of the extraction processing part 7. With input of a signal with the level $L_1$, an extraction signal as shown in (b) of FIG. 3 is obtained. For the levels $L_2$ and $L_3$, extraction signals as shown in (c) and (d) of FIG. 3 are obtained, respectively. In (b), (c) and (d) of FIG. 3, with an extraction signal above a level A, the amplification factors of the above-mentioned amplifiers 9 and 10 become 1 and 0, respectively. With an extraction signal below a level B, those of the amplifiers 9 and 10 become 0 and 1, respectively. With an extraction signal between the levels A and B, the amplifiers 9 and 10 have amplification factors varied between 1 and 0. The synthesizing part 5 performs synthesis in accordance with the above rule. Namely, in the part above the level A only the image signal A is sent out, while in the part below the level B only the image signal F is sent out. That is, only necessary parts are extracted. Between the levels A and B, the image signals A and F are added with a given ratio and sent out.

Figure 5:
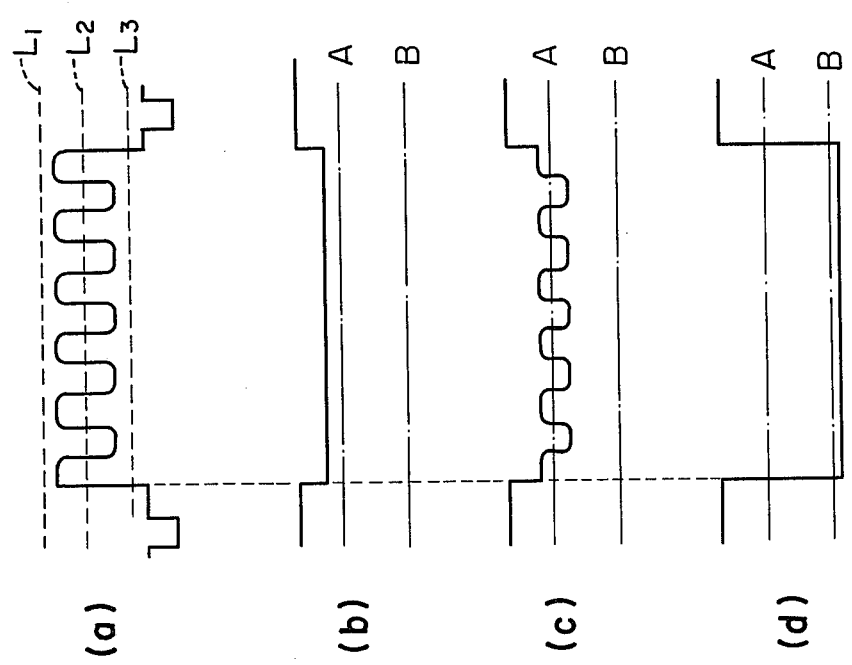
FIG. 5 shows wave forms for the explanation of the above apparatus.

Next, with reference to FIG. 5, how the scan domain controlling part 3 controls the image signal B will be explained.

Figure 6A:
FIGS. 6a to 6c show shapes of an image for the explanation of the above apparatus.
Figure 6B:
Figure 6C:

Consider that the figure of FIG. 4 is imaged by the television camera 2 under the same illumination condition. If the scan domain controlling part takes a domain of scan as shown in FIG. 6a, a wave form of the image signal in one horizontal period becomes as shown in (a) of FIG. 5. If the domain of scan is changed to a trapezoid as shown in FIG. 6b, the image signal would vary its brightness level, as can be seen from (b) of FIG. 5. Namely, the level of bright region in the narrower part of the scan domain is decreased more. The wave form (c) of FIG. 5 corresponding to the scan domain of FIG. 6c (of a shorter transversal length than that of FIG. 6b) makes it clear that the brightness level of the bright regions is also decreased. A similar variation in the brightness level also occurs in the vertical direction.

When such an image signal is used to form the extraction signal H, the amplification factors of the amplifiers 9 and 10 vary with the scan domain even though they operate to synthesize the parts of an object having the same brightness. As a result, such a defect occurs that unnecessary parts the removal of which are desired by the extraction signal can not be removed but imaged when the scan domain is changed.

This invention aims at overcoming the abovementioned defect. The objective is attained by the following signal constitution. That is, in the extraction processing part 7 of FIG. 1, signals with their quantity variable with the scan domain are applied from the scan domain controlling part 3, and added to the extraction quantity controlling signal G.

Figure 7:
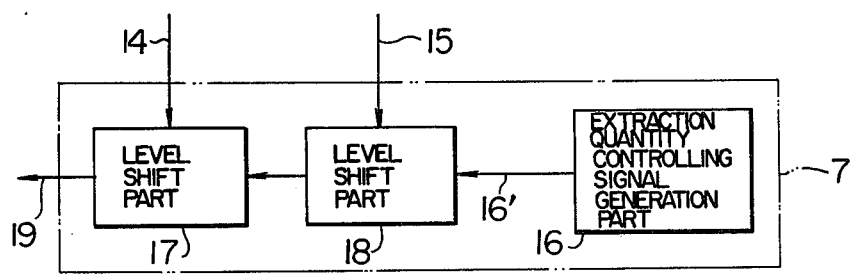
FIG. 7 is a block diagram of an image synthesizing apparatus according to this invention.

FIG. 7 shows a block diagram of an extraction processing part 7 which generates the above-mentioned extraction-quantity controlling signal. Other parts are constituted in the same way as shown in FIGS. 1 and 2. 14 denotes a signal representing variable quantity of the scan domain in the horizontal direction, while 15 denotes a signal representing variable quantity of the scan domain in the vertical direction. 16 is an extraction quantity controlling signal generation part. The level of a signal 16' is set either manually or automatically. The level of the signal 16' is increased or decreased in level shift parts 17 and 18 by the variable-quantities representing signals 14 and 15 for the scan domain. When the scan domain becomes broader, the extraction quantity controlling signal 19 exhibits a higher level than the signal 16', and vice versa. We introduce the extraction quantity controlling signal 19 into the extraction signal generation part 6. Assume that a part of an object with a uniform or same brightness is to be removed. Then, even if the scan domain is varied and the brightness level of the signal is thereby changed, the extraction level of the part to be removed varies in the same fashion. Therefore, it does not happen that the part to be removed is imaged. This will be explained in more detail with reference to the Figures. In (a) of FIG. 5, the part of the image signal above the level $l_1$ is removed from the synthesized image signal I. In the conventional method, when the level of the extraction quantity controlling signal is set at $l_1$ for the scan domain of FIG. 6b, the removed part (which could have been otherwise removed) on the left end is imaged. For the scan domain FIG. 6c all the removed parts are imaged. On the other hand, since the extraction-quantity controlling signal obtained by the constitution of this invention have the levels $l_2$ and $l_3$ as shown in (b) and (c) of FIG. 5 respectively, none of the removed parts is imaged. Therefore, as described above, by combining the variable quantities of scan domain of an image camera with the sample-quantity controlling signal, we can eliminate such a defect of the image sampling apparatus that an image part to be removed may be imaged when the image scan domain is varied.

I claim:

1. An image synthesizing apparatus comprising:
   means for supplying a first image signal;
   means for supplying a second image signal produced by a camera, said camera employing a changeable scan domain;
   synthesizing means for synthesizing an image output signal by combining said first and second image signals together with controlled amplitude ratios, said amplitude ratios being controlled by an extraction signal
   means for supplying a D.C. extraction quantity control voltage; and
   means for producing said extraction signal by superimposing upon said extraction quantity control voltage a voltage whose amplitude changes in accordance with changes in the shape of a scan domain employed by said camera.

2. An apparatus as in claim 1 wherein said amplitude synthesizing means comprises means responsive to said extraction signal for causing said image output signal to be said first image signal only, said second image signal only or a combination of said first and second image signals.

* * * * *